Dec. 20, 1949     T. R. SPALDING ET AL     2,492,014
COMBINED RESERVOIR AND ACCUMULATOR IN A HYDRAULIC
PUMP AND MOTOR TRANSMISSION SYSTEM
Filed Oct. 3, 1946

INVENTOR.
THOMAS R. SPALDING
BY HERMAN C. SCHROEDER

ATTORNEY

Patented Dec. 20, 1949

2,492,014

UNITED STATES PATENT OFFICE 2,492,014

COMBINED RESERVOIR AND ACCUMULATOR IN A HYDRAULIC PUMP AND MOTOR TRANSMISSION SYSTEM

Thomas R. Spalding, Solon, and Herman C. Schroeder, Parma, Ohio, assignors to Jack & Heintz Precision Industries, Inc., Cleveland, Ohio, a corporation of Delaware Application October 3, 1946, Serial No. 700,854

1 Claim. (Cl. 60—51)

This invention relates to energy storage units and more particularly to high pressure storage units for use with hydraulic systems.

The primary object of the invention is to provide a compact single unit as the reservoir and energy source for an hydraulic system.

A more particular object is to provide a reservoir and an accumulator combined into a single compact unit for use with hydraulic systems.

A further object is to provide a reservoir having an accumulator mounted therein for use in an hydraulic system to act as a single compact source of supply and energy.

A further object is to provide an energy storage unit for use with hydraulic systems which will free the operator from the dangers of an exposed high pressure energy unit.

A still further object is to provide a combined reservoir and energy storage unit in which the energy unit is mounted within the reservoir as a protection against shock.

Another object is to provide a reservoir having an accumulator mounted therein for use in hydraulic systems so that a relatively constant temperature can be maintained in the reservoir and in the accumulator.

With these and other objects in view the invention resides in the following specification and appended claim, certain embodiments and details of construction of which are shown in the accompanying drawing in which:

Figure 1:
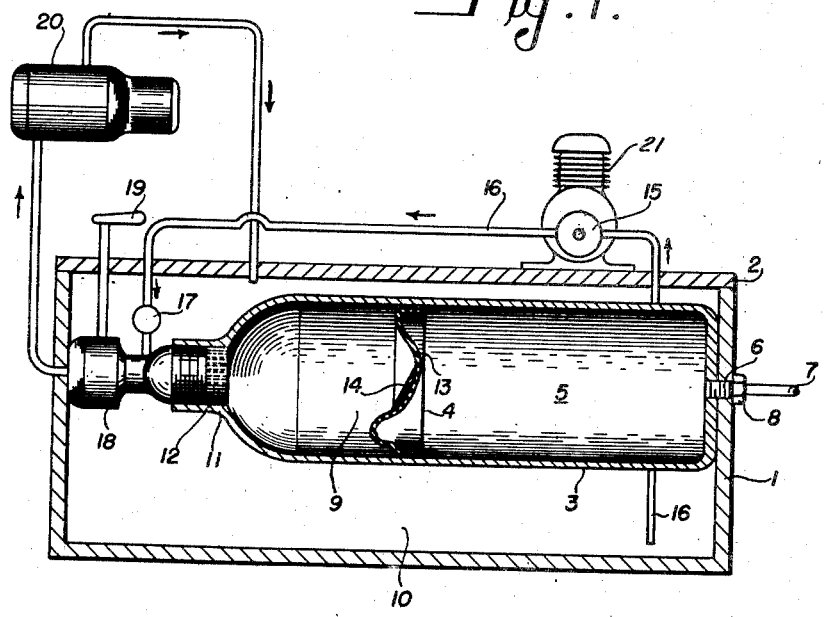
Figure 1 is a sectional view in side elevation of the storage unit with the hydraulic system connected thereto shown diagrammatically.
Figure 2:
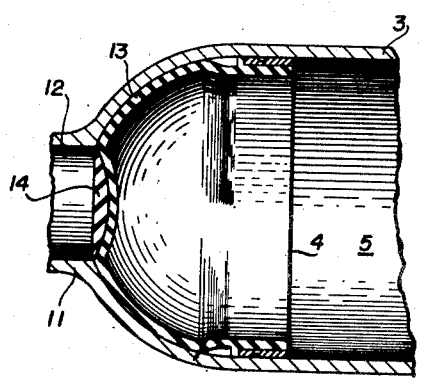
Figure 2 is a section of view of a portion of the accumulator showing the diaphragm in the extreme liquid exhaust position.

Referring more particularly to the drawing a tank 1 having a cover 2 is shown enclosing a cylindrical accumulator 3 which is held firmly in place by brackets which are not shown in the drawing. The accumulator 3 is provided with a freely sliding diaphragm 4. The space 5 to the right of the piston in Figure 1 accommodates a gas such as nitrogen or helium under high pressure. The threaded plug 6 in container 3 is provided as a support for the container 3 as well as for receiving the gas charge from line 7. A nut 8 is shown locking the tank 1 and accumulator 3 together.

The space 9 to the left of the piston accommodates hydraulic fluid such as a mineral base oil. The space 10 within tank 1 and around accumulator 3 acts as a reservoir for the hydraulic system with which the unit is used. The neck 11 of accumulator 3 contains a perforated plug 12 to prevent expansion of the diaphragm 4 into neck 11, and thereby obviate the possibility of its breaking in this manner. The form fitting bag 13 of diaphragm 4 is provided with a stiff member 14 of any suitable material to abut the plug 12.

A pump 15 is provided to recharge the space 9 in accumulator 3 by pumping fluid through line 16 to a valve 17 and into neck 11 of the accumulator. The arrows on the drawing indicate the flow to and from the hydraulic system during a cycle of operation.

A cycle of operation begins when the valve 18 is operated by handle 19 allowing the diaphragm 4 to move to the left forcing fluid into the hydraulic system under the force exerted by the compressed gas in space 5. The fluid in space 9 thus motivated may be used to actuate an hydraulic starter 20 on an internal combustion engine or the like. The hydraulic system which includes pump 15 and its driving engine 21 would recharge the accumulator 3 to its original pressure level by pumping fluid through line 16 and valve 17 into space 9.

A relatively constant temperature is maintained within the tank 1. The cooling of container 3 on discharge of fluid is counteracted by the return of warm fluid from the hydraulic system.

Figure 3:
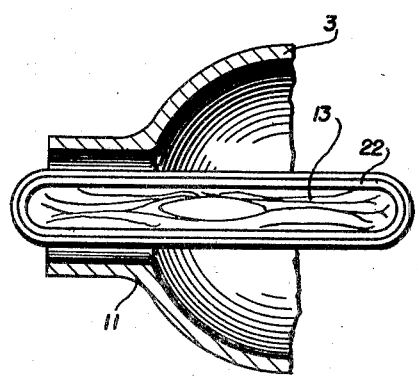
Figure 3 is a view similar to Figure 2 showing the diaphragm being inserted in the accumulator.

The diaphragm 4 is inserted in accumulator 3 as shown in Figure 3. The flexible band 22, to which material 13 is bonded by any suitable bonding means is merely compressed and inserted through the neck 11 of the accumulator 3.

By mounting the accumulator 3 within the tank 1 the imminent dangers of exposing an operator to a high pressure gas storage unit are eliminated, as well as protecting the unit itself from undue shocks.

Figure 4:
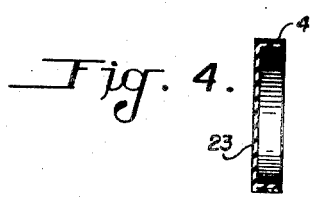
Figure 4 is a section of view in side elevation of a variation of the piston showing an expansible material.

Figure 4 shows the freely sliding diaphragm with an elastic portion 23 which will from the pressure of the gases stretch to conform to the radius of the neck 11 and the flat portion of perforated plug 12. Elastic portion 23 may be bound in any suitable manner to diaphragm 4.

Thus it is seen that a simple, efficient and compact energy storage unit has been provided for use with hydraulic systems. In the previously suggested use with engines as the energy source for the starting system the unit becomes readily adaptable for installation on heavy duty tractors, "bulldozers" and the like in lieu of batteries.

Although the description of the invention has discussed the use of hydraulic fluid such as mineral base oil, it is readily realized that other fluids including gases could be utilized.

We claim:

A fluid energy storage unit for use in hydraulic systems for producing hydraulic forces for doing work, a closed liquid storage reservoir, an accumulator having compartments therein separated by a slidable diaphragm for separately receiving liquid and pressure gas, said accumulator being removably mounted wholly within said reservoir, means for pumping liquid from said reservoir into the liquid compartment of said accumulator, means for returning the liquid to said reservoir after it has done the work, said accumulator being in thermal contact with the liquid in said reservoir, whereby the tendency of said accumulator, upon liquid discharge, to cool is counteracted by the heat of the liquid heated by doing work and returned to said reservoir.

THOMAS R. SPALDING.
HERMAN C. SCHROEDER.

REFERENCES CITED

The following references are of record in the file of this patent:

UNITED STATES PATENTS

| Number | Name | Date |
| --- | --- | --- |
| 1,130,659 | Baldwin | Mar. 2, 1915 |
| 1,191,469 | Rixen | July 18, 1916 |
| 1,796,936 | Montgomery | Mar. 17, 1931 |
| 2,079,858 | Horten | May 11, 1937 |
| 2,233,014 | Indrieri | Feb. 25, 1941 |
| 2,256,835 | Mercier | Sept. 23, 1941 |
| 2,283,439 | Herman | May 19, 1942 |
| 2,406,197 | Christensen | Aug. 20, 1946 |